Nov. 23, 1948.   R. D. ACTON   2,454,684
TRACTOR POWER DEVICE
Filed Nov. 22, 1946
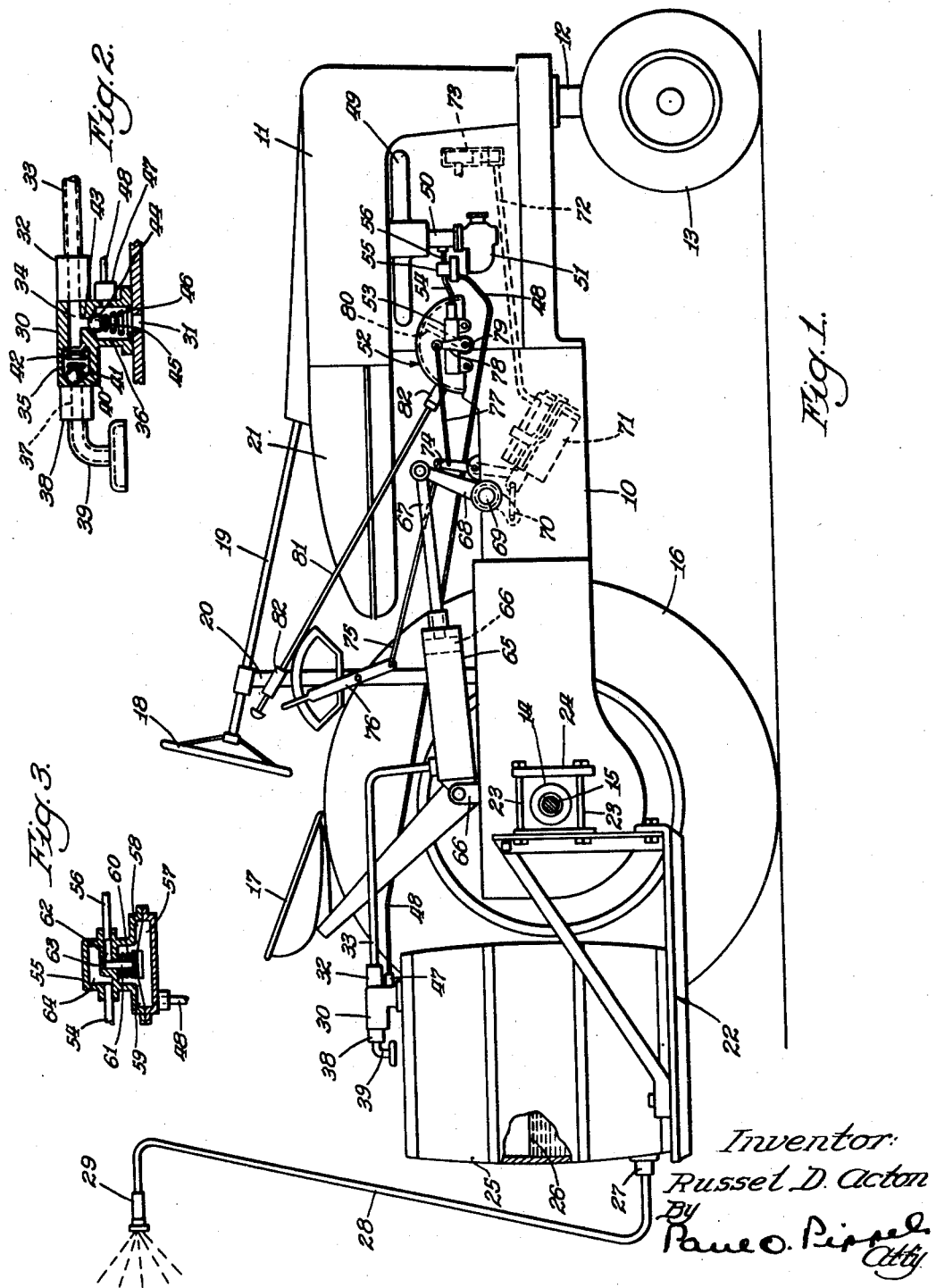
Inventor:
Russel D. Acton Patented Nov. 23, 1948

2,454,684

UNITED STATES PATENT OFFICE 2,454,684

TRACTOR POWER DEVICE

Russel D. Acton, Chicago, Ill.

Application November 22, 1946, Serial No. 711,595

7 Claims. (Cl. 230—38)

This invention relates to a power take-off mechanism for tractors. More specifically, it relates to mechanism for utilizing an oscillating device powered by the tractor associated with means for continuously operating such a mechanism.

In recent years the trend has been to equip farm tractors with power take-off devices capable of producing movement (reciprocating or oscillating) of an implement mounted on a tractor. Such a power operated implement has been used primarily for lifting and adjusting tools mounted on the tractor or connected thereto in trailing position.

There are many uses in addition to the adjustment of tractor mounted tools for which reciprocating or oscillating power can be used once it is provided on the tractor. Although the original cost of installation of such a power take-off device is quite high, once it has been installed as a part of a tractor it can be used for many other purposes which in themselves will not justify the cost of installation.

The principal object of the present invention is to provide tractor operated means for continuously operating an oscillating power take-off device associated with the tractor.

Another object is to provide a tractor operated mechanism utilizing a reciprocating or oscillating power take-off element for maintaining pressure in a container.

Another specific object is to utilize a vacuum motor oscillated by manifold depression for operating a control lever which controls a device utilizing tractor power for operating a power take-off member.

Another object is to provide a pressure operated control device for regulating a vacuum motor associated with the tractor power take-off device.

The above objects and others which will be apparent from the detailed description to follow are aided by a construction, one embodiment of which is shown in the drawings, in which:

Figure 1 is an elevational view of a tractor having a pressure container mounted thereon, oscillating power take-off mechanism, and a vacuum control device for said mechanism;

Figure 2 is an enlarged sectional view showing the valve construction which is mounted on the liquid container in Figure 1; and Figure 3 is an enlarged sectional view of the vacuum control valve shown in Figure 1.

In Figure 1 a conventional tractor is illustrated having a longitudinally extending body 10, a hood and radiator structure 11, a front bolster 12 on which steerable wheels 13 are supported, transversely extending rear axle structures 14, one of which is visible, drive axles 15, one of which is shown in section, and traction wheels 16, one of which has been removed to better show the mounting for the liquid container. An operator's station 17, the steering wheel 18, a steering column 19 and a support 20 for said column, and a fuel tank 21 are also shown in Figure 1.

A rearwardly extending frame structure designated in its entirety with the reference character 22 is pivotally connected by bolts 23 and a clamping member 24 to the axle housings 14. Said frame structure furnishes a support for a liquid container which is illustrated as a barrel 25.

A portion of the barrel 25 is broken away in section to show a liquid level 26. A fitting 27 in the bottom of the barrel provides communication for the liquid therein with a hose 28 which is shown as being provided with spray nozzle 29. At the upper end of the barrel 25 a valve casing 30 is mounted, said casing communicating with the barrel through an opening 31 formed at the upper end thereof as shown in Figure 2. Said valve casing includes a fitting 32 at one end which communicates with a flexible conduit 33. Said conduit communicates with a bore 34 formed in the casing, said bore in turn communicating with a valve chamber 35 and a valve chamber 36. The valve chamber 35 communicates with a bore 37 formed in a fitting 38. The fitting 38 is provided with an intake member 39 for the inflow of air into the valve casing. A valve seat 40 is formed where the bore 37 communicates with the valve chamber 35. A ball valve 41 is urged by a spring 42 against the seat 40. It will be understood that said valve is opened by reduced pressure in the valve chamber 35 to permit the flow of air into said chamber.

The valve chamber 36 communicates through a bore 43 with the bore 34. A valve seat 44 formed around said bore cooperates with a ball valve 45 to close the bore 30. A spring 46 urges the ball 45 into seated position. It will be understood that when pressure in the bore 34 exceeds the pressure in the valve chamber 36 the valve 45 opens to permit the flow of air under pressure through the opening 31 into the barrel 25 thereby building up pressure above the liquid contained in the barrel.

A fitting 47 communicates with the chamber 36. Said fitting is connected to a small conduit 48 which functions for a purpose to be hereinafter described.

In Figure 1 an engine manifold 49 is illustrated, said manifold being provided with an intake riser 50 which is connected to a conventional carburetor 51. During the functions of the engine the vacuum in the manifold will depend upon the load imposed on the engine. Said vacuum at no times is sufficient in amount to operate a vacuum motor such as are widely used for the operation of windshield wipers. Such a vacuum motor identified in its entirety by the reference character 52 is shown mounted along side the tractor. A valve cage 53 formed along side the vacuum motor is connected to a conduit 54 which communicates with a valve casing 55. Said casing also communicates through a conduit 56 with the riser 50 whereby manifold vacuum is supplied to the vacuum motor as regulated by the valve structure in the casing 55. As shown in the section of Figure 3, the conduit 48 which was previously described and which carries the pressure above the liquid in the barrel 25 communicates with a chamber 57 formed at the lower side of the casing 55. A diaphragm 58 separates the chamber 57 and a chamber 59. A compression spring 60 in the chamber 59 abuts the upper side of the diaphragm 58 urging said diaphragm in a downward position against pressure in the chamber 57. When said pressure reaches a pre-determined amount the diaphragm is moved upwardly against the spring 60 to the position shown in Figure 3. In this position a valve 61 carried by the diaphragm extends into a chamber 62 formed in the valve casing in communication with the conduit 56, and through said chamber to close an outlet opening 63 leading from said chamber to a chamber 64. The chamber 64 communicates wtih the conduit 54. It will be understood that with the diaphragm 58 in the position shown in Figure 3 communication is closed between the conduits 54 and 56 whereby the vacuum motor is at rest, and also that when the diaphragm moves downwardly the valve 61 is moved away from the opening 63 establishing operating communication between the conduit 54 and the conduit 56 thereby putting the vacuum motor in operation.

A pump cylinder 65 is pivotally mounted on a bracket 66 secured to the rear portion of the tractor body 10. The conduit 33 is in communication with the rear end of the cylinder 65 whereby air may be drawn in past the valve 35 as previously described and discharged under pressure past the valve 45 into the container 25 as heretofore described. A piston 66 shown in dotted lines is carried on a piston rod 67 which is pivotally connected to a power actuated arm 68 mounted for oscillation on a shaft 69. By construction shown diagramatically in dotted lines the shaft 69 carries a crank arm 70 which is adapted to be oscillated by a fluid pressure device 71 located within the body of the tractor 10. Said device is adapted to be operated by fluid under pressure delivered through a conduit 72 from a pump 73 located at the front end of the tractor power plant and adapted to be continuously driven thereby. Said power device is of a conventional follow-up type in which an actuating control element 74 connected by a link 75 to a control lever 76 regulates the position of the arm 68. By means of said control lever 76 the arm 68 moves fore and aft following the movement of the control lever 76. In order to continuously operate the power device for operating the arm 68 a link 77 is connected to the control element 74 and to an arm 78 mounted for oscillation with a shaft 79 which is connected to an oscillating plate or piston 80 of the vacuum motor 52. As previously stated said motor is of the oscillating type as used almost universally for windshield wipers on automobiles. When put into operation said motor continuously oscillates the control element 74 and thereby continuously oscillates the arm 68. So long as said arm oscillates air under pressure is delivered to the container 25.

A control rod 81 slidably and rotatably mounted in a bracket 82 on the steering column support 20 extends into a fitting 82 on the vacuum motor 52. Said control rod as is conventional in a bracket on a vacuum motor of this type is adapted by push-pull movement to control the off and on position of the valve for the vacuum motor and by rotation is adapted to control the speed of operation of said motor. These details are not a part of the invention as claimed but are mentioned as showing how a conventional vacuum motor may be applied in a combination including the invention.

The conduit 48 previously referred to in connection with the description of Figure 3 communicates with the chamber 36 for applying the pressure above the liquid level 26 in the container 25 to the chamber 57 and against the diaphragm 58. It will be understood that by the construction as described when the pressure above the liquid level 26 is below the pressure pre-determined by the spring 60 against the diaphragm 58 the system is in condition for operation. When this condition exists and when the tractor engine is running supplying fluid under pressure from the pump 73 and developing a vacuum in the manifold riser 50 an operator may start the action of the pump by opening the control valve of the vacuum motor 52 by means of the control rod 81. This pumping action will then continue until air pressure above the liquid level 26 is sufficient to operate the valve 61 against the spring action 60 to close communication between the vacuum line 56 and the vacuum motor. This action is entirely automatic and will go into operation whenever pressure decreases in the container 25 by the withdrawal of liquid therefrom.

It is to be understood that applicant has shown and described a continuous pump device operated by a power lift arm on a tractor in conjunction with a container having fluid maintained under pressure. It is to be understood, however, that all uses and modifications of applicant's tractor power take-off device which fall within the following claims are included as a part of the invention.

What is claimed is:

1. A power take-off device for a tractor having a power plant having an engine, a carburetor and a manifold, a power lift arm, and a power supplying device operable by the power plant of the tractor to operate said power lift arm, an oscillating control lever operatively associated with said power supplying device for causing the movement of said arm in opposite angular directions, and in combination therewith, a reciprocable working member mounted on the tractor and connected to the power lift arm for movement thereby, a motor mounted on the tractor and operated from the power plant thereof, said motor having an oscillating operating arm, and means for connecting said motor arm to the control lever for the power supplying device.

2. A power take-off device for a tractor having a power plant having an engine, a carburetor and a manifold, a power lift arm, and a power supplying device operable by the power plant of the tractor to operate said power lift arm, an oscillating control lever operatively associated with said power supplying device for causing the movement of said arm in opposite angular directions, and in combination therewith, a pump cylinder mounted on the tractor and connected to the power lift arm for movement thereby, a motor mounted on the tractor and operated from the power plant thereof, said motor having an oscillating operating arm, means for connecting said motor arm to the control lever for the power supplying device, a container, conduit means connecting said pump and said container, and means operable by the pressure in said container for controlling the operation of the motor and the power lift arm.

3. A power take-off device for a tractor having a power plant having an engine, a carburetor and a manifold, a power lift arm, and a power supplying device operable by the power plant of the tractor to operate said power lift arm, an oscillating control lever operatively associated with said power supplying device for causing the movement of said arm in opposite angular directions, and in combination therewith, a reciprocable working member mounted on the tractor and connected to the power lift arm for movement thereby, a vacuum motor mounted on the tractor, a conduit for connecting said motor with the manifold at the low pressure side of the carburetor, said vacuum motor having an oscillating operating arm actuated by the fluid pressure therein and means for connecting said motor arm to the control lever for the power supplying device.

4. A power take-off device for a tractor having a power plant having an engine, a carburetor and a manifold, a power lift arm, and a power supplying device operable by the power plant of the tractor to operate a power lift arm, an oscillating control lever operatively associated with said power supplying device for causing the movement of said arm in opposite angular directions, and in combination therewith, a pump cylinder mounted on the tractor and connected to the power lift arm for movement thereby, a vacuum motor mounted on the tractor, a conduit for connecting said motor with the manifold at the low pressure side of the carburetor, said vacuum motor having an oscillating operating arm actuated by the fluid pressure therein and means for connecting said motor arm to the control lever for the power supplying device.

5. A power take-off device for a tractor having a power plant having an engine, a carburetor and a manifold, a power lift arm and a power supplying device operable by the power plant of the tractor to operate said power lift arm, an oscillating control lever operatively associated with said power supplying device for causing the movement of said arm in opposite angular directions, and in combination therewith, a pump cylinder mounted on the tractor and connected to the power lift arm for movement thereby, a valve structure communicating with said cylinder and containing valves operable to provide for the intake of air from the atmosphere on the suction structure of said cylinder and for the discharge of air on the compression structure of the cylinder, a vacuum motor mounted on the tractor, a conduit for connecting said motor with the manifold at the low pressure side of the carburetor, a pressure operated valve in said conduit, conduit means connected to the space in the container for actuating said valve to open said conduit when pressure falls a predetermined amount in said container and to close said conduit when the pressure rises to a predetermined amount, said vacuum motor having an oscillating operating arm actuated by the fluid pressure and means for connecting said motor arm to the control lever for the power supplying device.

6. A power take-off device for a tractor having a power plant having an engine, a carburetor and a manifold, a power lift arm and a power supplying device operable by the power plant of the tractor to operate said power lift arm, manual control means operatively associated with said power supplying device for the movement of said arm in opposite angular directions, and in combination therewith, a receptacle mounted on the tractor and adapted to contain a liquid and a space for air under pressure above said liquid, a pump cylinder mounted on the tractor and connected to the power lift arm for movement thereby, a valve structure communicating with said cylinder and with said container and containing valves operable to provide for the intake of air on the suction stroke of said cylinder and for the discharge of air on the compression stroke of the cylinder, said valve structure being provided with conduits to receive the air from the atmosphere and to deliver it to the space in the container, a vacuum motor mounted on the tractor, a conduit for connecting said motor with the manifold at the low pressure side of the carburetor, a pressure operated valve in said conduit, conduit means connected to the space in the container for actuating said valve to open said conduit when pressure falls a predetermined amount in said container and to close said conduit when the pressure rises to a predetermined amount, said vacuum motor having an oscillating operating arm actuated by the fluid pressure therein and means for connecting said motor arm to the control means for the power supplying device.

7. A power take-off device for a tractor having a power plant having an engine, a carburetor and a manifold, a power lift arm and a power supplying device operable by the power plant of the tractor to operate said power lift arm, manual control means operatively associated with said power supplying device for causing the movement of said arm in opposite angular directions, and in combination therewith, a receptacle for air under pressure, a pump cylinder mounted on the tractor and connected to the power lift arm for movement thereby, a valve structure communicating with said cylinder and with said container and containing valves operable to provide for the intake of air on the suction stroke of said cylinder and for the discharge of air on the compression stroke of the cylinder, said valve structure being provided with conduits to receive the air from the atmosphere and to deliver it to the space in the container, a vacuum motor mounted on the tractor, a conduit for connecting said motor with the manifold at the low pressure side of the carburetor, a pressure operated valve in said conduit, conduit means connected to the space in the container for actuating said valve to open said conduit when pressure falls a predetermined amount in said container and to close said conduit when the pressure rises to a predetermined amount, said vacuum motor having an oscillating operating arm actuated by the fluid pressure therein and means for connecting said motor arm to the control means for the power supplying device.

RUSSEL D. ACTON.

No references cited.